Oct. 18, 1966   K. H. WENZLAFF ET AL   3,278,969
FOLDABLE DUST PAN
Filed Jan. 13, 1964                    2 Sheets-Sheet 1
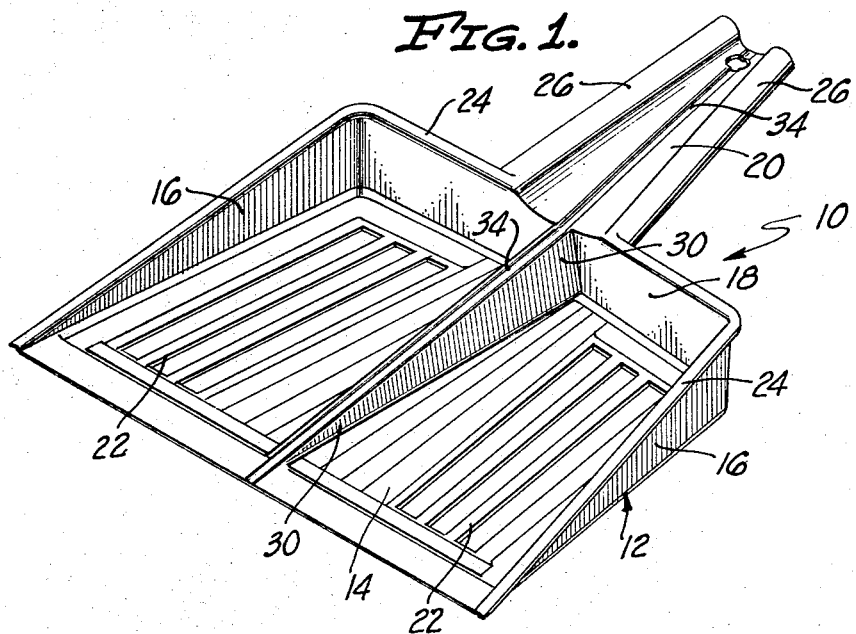
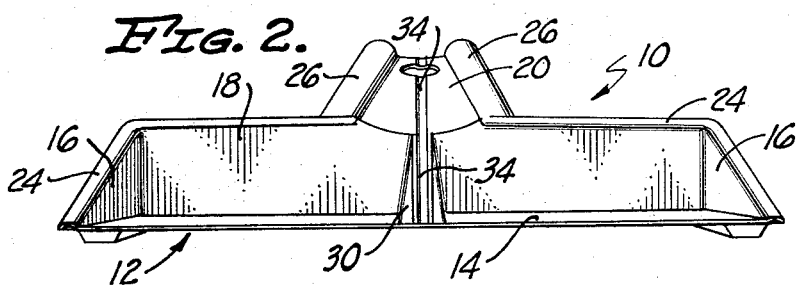
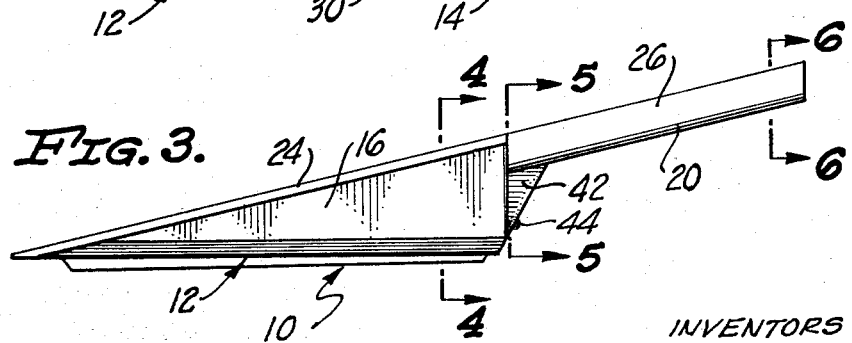
INVENTORS
KARL H. WENZLAFF,
LORRAINE E. WENZLAFF
BY
MAHONEY, HALBERT &
HORNBAKER
ATTORNEYS Oct. 18, 1966  K. H. WENZLAFF ETAL  3,278,969
FOLDABLE DUST PAN
Filed Jan. 13, 1964  2 Sheets-Sheet 2
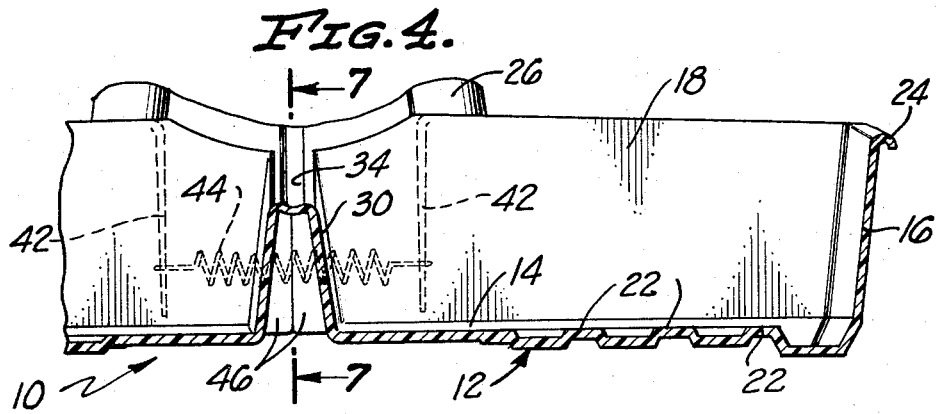
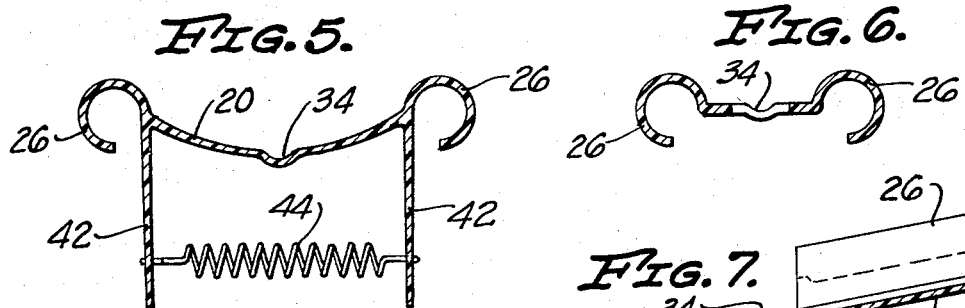
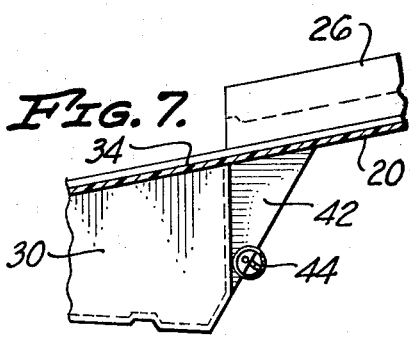
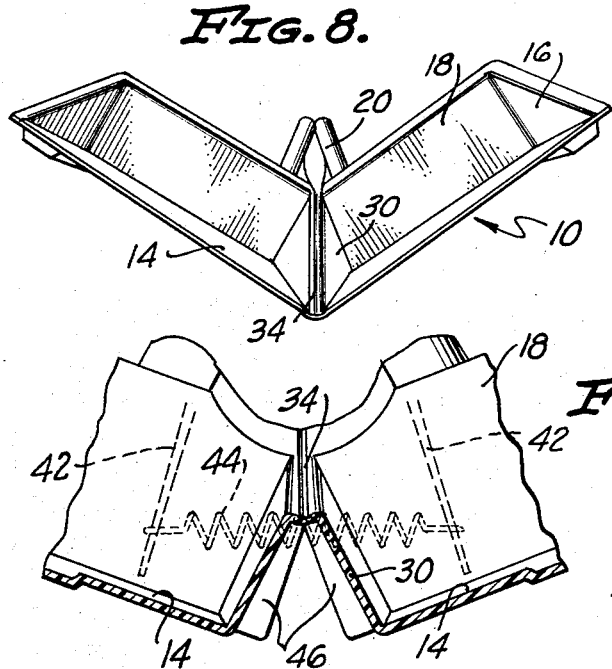
INVENTORS
KARL H. WENZLAFF,
LORRAINE E. WENZLAFF
BY
MAHONEY, HALBERT &
HORNBAKER
ATTORNEY

United States Patent Office 3,278,969
Patented Oct. 18, 1966

3,278,969
FOLDABLE DUST PAN
Karl H. Wenzlaff and Lorraine E. Wenzlaff, Northridge, Calif., assignors of twenty-two and one-half percent to Thomas P. Mahoney, Pacific Palisades, Calif.
Filed Jan. 13, 1964, Ser. No. 337,402
6 Claims. (Cl. 15—257.7)

This invention relates to a dust pan and, more particularly, to a pan characterized by the fact that the pan portion thereof may be deformed into a trough to facilitate the discharge from the pan portion of dust and dirt collected therein.

It is well known to those skilled in the art, such as housewives, that conventional rigid dust pans perform effectively to collect dust and dirt but are generally characterized by the fact that the controlled and guided discharge of the collected dust and dirt therefrom is somewhat difficult. The difficulty adverted to is attributable to the fact that the pan portions of conventional dust pans are relatively elongated to facilitate the collection of dust and dirt. However, the elongate nature of the pan portion of conventional dust pans results in the aforementioned difficulty in discharging the contents thereof because the pan portion is frequently wider than the receptacle, such as a wastebasket, into which the contents of the pan portion are being discharged.

It is, therefore, an object of our invention to provide a dust pan characterized by the fact that the pan portion thereof is divided into first and second portions or areas which are adapted to be folded or bent up toward each other and thus define a collecting trough located centrally of the pan portion whereby all of the dust and dirt may be channeled into said trough and readily disposed of into a receptacle, such as a wastebasket or the like.

Another object of our invention is the provision of a dust pan of the aforementioned character which includes a unitary body having a hinge located intermediate its opposite edges whereby the first and second portions of the pan portion of the dust pan may be folded or bent upwardly toward each other with facility to define the aforementioned collection trough.

Another object of our invention is the provision of a dust pan of the aforementioned character whose body is provided with a handle whose edges are adapted to be bent upwardly toward each other to cause the corresponding bending of the first and second portions of the pan portion upwardly toward each other to define the collection trough therein.

A further object of our invention is the provision, in a dust pan of the aforementioned character, of spring means adapted to maintain the first and second portions of the pan in coplanar relationship when said dust pan is being utilized for the collection of dust or dirt.

An additional object of our invention is the provision, in a dust pan of the aforementioned character, of tension spring means connected between the first and second portions of the pan portion of the dust pan to urge said first and second portions of said pan portion downwardly into coplanar relationship with each other.

An additional object of our invention is the provision of stop means between the first and second portions of the pan portion of the dust pan adapted to locate said first and second portions in the aforementioned coplanar relationship.

Other objects and advantages of the invention will be apparent from the following specification and the accompanying drawings, which are for the purpose of illustration only, and in which:

FIG. 1 is a perspective view of the foldable dust pan of the invention;
FIG. 2 is a front elevational view;
FIG. 3 is a side elevational view;
FIG. 4 is a vertical sectional view taken on the broken line 4—4 of FIG. 3;
FIG. 5 is a vertical sectional view taken on the broken line 5—5 of FIG. 3;
FIG. 6 is a vertical sectional view taken on the broken line 6—6 of FIG. 3;
FIG. 7 is a vertical sectional view taken on the broken line 7—7 of FIG. 4;
FIG. 8 is a folded elevational view illustrating the foldable dust pan in its folded attitude; and,
FIG. 9 is an enlarged fragmentary, sectional view.

Referring to the drawings, and particularly to FIGS. 1–3 thereof, we show a dust pan 10, constructed in accordance with the teachings of our invention and fabricated from any one of a number of different types of synthetic plastic resins characterized by their susceptibility to voluntary deformation, such as polypropylene, or the like. The dust pan 10 can be fabricated by conventional molding processes well known to those skilled in the art. However, it is not intended that the teachings of the invention be limited to any particular method of fabrication or to the particular material adverted to hereinabove since it is well known to those skilled in the art that various methods of fabrication and alternative materials may be utilized in manufacturing the dust pan of the invention.

The dust pan 10 is constituted by a body 12 having a bottom 14, side walls 16 and a rear wall 18. Formed integrally with the rear wall 18 is a handle 20 which is adapted to be grasped to facilitate the utilization of the pan 10.

The bottom 14 incorportaes a plurality of stiffening ribs 22 which, as best shown in FIGS. 2 and 4 of the drawings, serve to rigidfy said bottom. A stiffening flange 24 is provided on the upper edges of the side and rear walls 16 and 18 respectively, and the edges of the handle 20 are provided with rolled flanges 26 which serve to correspondingly stiffen the edges of said handle.

Formed integrally with the bottom 14 of the dust pan 10 and centrally thereof is a rib 30 of substantially triangular configuration in both side elevation and cross section, as best shown in FIGS. 1, 4 and 9 of the drawings. The forward extremity of the rib 30 terminates adjacent the forward edge of the bottom 14 of the dust pan 10 and the rear extremity of the rib 30 terminates at the rear wall 18.

An arcuate groove 34 is formed in the upper surface of the rib 30 and extends rearwardly into the handle 20, thus constituting a hinge about which the opposite portions of the pan on opposite sides of the rib 30 may be folded or bent into the attitude illustrated in FIG. 8 of the drawings so that dust, dirt, or other debris collected in the pan 10 in a conventional manner will collect on opposite sides of the rib 30 and be guided thereby into a suitable receptacle.

Formed integrally with the handle 20 is a pair of gusset plates 42, which are of triangular configuration and which, as best shown in FIGS. 3 and 7 of the drawings, are provided with openings adapted to receive the opposite extremities of a tension spring 44. The spring 44 maintains the bottom 14 of the dust pan 10 in the planar orientation of FIGS. 1–4 of the drawings, by urging the adjacent edges of two stops 46, FIGS. 4 and 9, into operative engagement with each other. The stops are located in the inner extremity of the underside of the rib 30 adjacent the back 18 of the dust pan and, when the bottom 14 of the dust pan is in the planar orientation of FIG. 4 of the drawings, the stops 46 are disposed in contiguity with each other by the action of the tension spring 44.

Therefore, when the dust pan 10 is being utilized to collect dust or other debris, the forward edge of the bottom 14 of said dust pan is disposed upon the desired surface and the dust or debris collected therein on opposite sides of the centrally located rib 30. After a sufficient quantity of dust or debris has been collected, the dust pan can be folded about the rib 30 by merely compressing the rolled flanges 26 of the handle 20 toward each other to cause the corresponding expansion of the sides of the rib 30 away from each other, as best shown in FIG. 9 of the drawings. When such compression of the edges 26 of the handle 20 toward each other occurs, the tension spring 44 is extended and the oppositely oriented portions of the bottom 14 of the dust pan 10 are caused to assume the angular position illustrated in FIGS. 8 and 9 of the drawings.

Therefore, the dust or debris collects at the opposite sides of the rib 30 and can be readily discharged into a receptacle of relatively small size.

Moreover, the facility with which the dust pan 10 may be bent about the axis constituted by the triangular rib 30 also permits one one-half of the bottom 14 of the dust pan to be utilized in corners and in other locations where limited space is available and where a conventional dust pan could not perform the necessary function. One of the desirable aspects of the dust pan 10 of the invention lies in the fact that the collected dust and debris is channeled by the centrally located rib 30 at the forward edge of the bottom 14 of the dust pan 10 at a point located centrally thereof. Therefore, the dust and debris is guided by the lower edges of the rib 30 into a receptacle of any desired size without the customary spilling which occurs when conventional dust pans are utilized.

There is thus provided by our invention a dust pan characterized by the ease with which it may be utilized to dispose of dust and debris into relatively small size receptacles. In addition, the facility with which the dust pan may be bent around an axis constituted by a centrally located rib permits one-half of the bottom of the dust pan to be utilized in restricted areas, such as corners, or the like, when cleaning in such areas. Furthermore, the provision of positive spring means in association with the foldable dust pan of our invention insures that the bottom thereof will be returned to the planar configuration normally desired when the dust pan is utilized in the collection of dust or debris.

We claim:

1. In a dust pan, the combination of: a unitary, one-piece body defining a shallow pan, a handle on said pan and a hinge located intermediate the opposite portions of said pan, said hinge being constituted by a unitary rib extending from the front edge of said pan to the back wall thereof and dividing said back wall into two portions.

2. In a dust pan, the combination of: a body having a hinge projecting upwardly to define first and second pan portions having bottoms which are movable out of substantially coplanar relationship about said hinge toward each other to define troughs in said body on opposite sides of said hinge adapted to receive dust and dirt collected in said dust pan, said hinge extending through the back wall of said body to further separate said first and second pan portions, said body having a handle connected thereto, said handle having first and second portions connected, respectively, to said first and second pan portions of said body and said first and second portions of said handle being movable toward each other out of substantially coplanar relationship to cause corresponding movement of the first and second portions of said body; and spring means connected between the first and second portions of said body adapted to maintain said bottoms in substantially coplanar relationship.

3. In a dust pan, the combination of: a body having a hinge projecting upwardly to define first and second portion having bottoms which are movable out of coplanar relationship about said hinge toward each other to define troughs in said body on opposite sides of said hinge adapted to receive dust and dirt collected in said dust pan, said hinge extending through the back wall of said body to further separate said first and second pan portions, said body having a handle connected thereto, said handle having first and second portions connected, respectively, to said first and second portions of said body and said first and second portions of said handle being movable toward each other out of substantially coplanar relationship to cause corresponding movement of the first and second portions of said body; and spring means connected between the first and second portions of said body adapted to maintain said bottoms in substantially coplanar relationship, said spring means being constituted by a tension spring.

4. In a dust pan, the combination of: a body having a hinge projecting upwardly to define first and second portions having bottoms which are movable out of coplanar relationship about said hinge toward each other to define troughs in said body on opposite sides of said hinge adapted to receive dust and dirt collected in said dust pan, said hinge extending through the back wall of said body to further separate said first and second pan portions, said body having a handle connected thereto, said handle having first and second portions connected, respectively, to said first and second portions of said body and said first and second portions of said handle being movable toward each other out of substantially coplanar relationship to cause corresponding movement of the first and second portions of said body, said hinge including an integral rib extending from the lower edge of said body between said first and second portions; and spring means connected between the first and second portions of said body adapted to maintain said bottoms in substantially coplanar relationship.

5. In a dust pan, the combination of: a body having a hinge projecting upwardly to define first and second portions having bottoms which are movable out of substantially coplanar relationship about said hinge toward each other to define troughs in said body on opposite sides of said hinge adapted to receive dust and dirt collected in said dust pan, said hinge extending through the back wall of said body to further separate said first and second pan portions, said body having a handle connected thereto, said handle having first and second portions connected, respectively, to said first and second portions of said body and said first and second portions of said handle being movable toward each other out of substantially coplanar relationship to cause corresponding movement of the first and second portions of said body, said hinge including an integral rib extending from the lower edge of said body between said first and second portions to the rear wall of said body.

6. In a dust pan, the combination of: a unitary body defining a shallow pan having first and second portions incorporating bottoms which are bendable toward each other, and a handle connected to said body having corresponding first and second portions which are bendable toward each other to cause the corresponding bending of said first and second portions of said pan toward each other, said first and second portions having stop means thereupon adapted to engage each other to locate said first and second portions in coplanar relationship, and a spring between said first and second portions of said pan for urging said bottoms into substantially coplanar relationship.

References Cited by the Examiner
UNITED STATES PATENTS

| | | | |
|---|---|---|---|
| 637,908 | 11/1899 | Vroman | 15—257.1 |
| 2,475,619 | 7/1949 | Johnson | 15—257.7 |
| 2,583,154 | 1/1952 | Pape | 15—257.7 |
| 2,666,309 | 1/1954 | Anderson et al. | 15—257.7 |

CHARLES A. WILLMUTH, *Primary Examiner.*

WALTER A. SCHEEL, *Examiner.*

L. G. MACHLIN, *Assistant Examiner.*